UNITED STATES PATENT OFFICE 2,292,469

SMOKELESS POWDER

Fredrich Olsen, Alton, Ill., assignor to Western Cartridge Company, East Alton, Ill., a corporation of Delaware No Drawing. Application September 25, 1939, Serial No. 296,395

8 Claims. (Cl. 8—20)

This invention relates generally to explosives and particularly to the manufacture of smokeless propellent powder.

Smokeless propellent powder is generally made from nitrocellulose as the base material. The nitrocellulose may be derived from purified cellulose, such as from cotton linters or from wood, which is then nitrated by being treated with nitric and sulphuric acids.

In the manufacture of nitrocelulose as generally practiced, it is necessary to subject the nitrated cellulose to extensive purification treatments, including a mechanical beating step and a succession of prolonged boiling and washing operations, in order to remove the spent acid and unstable esters from the nitrocellulose fibers. A large amount of water is required for these purification treatments since, as a general rule about one hundred gallons of water is required for each pound of smokeless powder produced, and the purification steps involve a considerable consumption of heat in carrying out of the multitudinous boiling treatments.

In order to convert nitrocellulose, which has been purified, into gelatinized or colloided smokeless powder grains, it has heretofore been customary in the art to replace the water contained in the nitrocellulose with alcohol by means of a displacement process, carried out with special dehydration presses or centrifuges. The alcohol-containing nitrocellulose was then colloided by the incorporation of a solvent such as ether in suitable mixing apparatus. For obtaining grains which were extruded and cut, the colloid was then subjected to a succession of pressing operations such as through a macaroni, a blocking, and a graining press, while for obtaining flake powders, the colloid was passed through a series of rolls to form a sheet. These manufacturing processes, as heretofore carried out, were lengthy and troublesome, required extensive mechanical equipment, and necessitated a large number of successive operations, some of them dangerous.

The object of the present invention, generally stated, is to provide a process of manufacturing gelatinzed smokeless powder whereby the purification treatments, and other manufacturing operations, may be substantially shortened.

Another object of the present invention is to provide a process of purifying nitrocellulose whereby the nitration acid remaining therein may be readily accessible for removal or neutralization.

A further object of the invention is to provide a process of manufacturing extruded grains of colloided smokeless powder whereby the duration and number of manufacturing steps are reduced.

Still another object of the invention is to provide a process of making smokeless powder grains of the extruded type wherein the hitherto indispensable step of displacement dehydration of nitrocellulose fibers is avoided.

Other objects will become apparent to those skilled in the art when the following description is read.

In accordance with this invention, a greatly simplified procedure is provided for accomplishing the desired purification of the nitrocellulose as well as the gelatinization thereof and the formation of grains. Nitrocellulose in impure and unstable condition is treated with a suitable solvent to form a lacquer from which the impurities are then readily removed by agitation in a suitable non-solvent bath. By distilling off a sufficient amount of the solvent during continued agitation, the gelatinized nitrocellulose becomes converted to preliminary grains. These preliminary or intermediate grains, which are in the form of partially solidified yet pliable particles, may be readily converted by a series of simple operations to the final grain form that is desired.

If the solvent for the powder base is selected so that it will be substantially immiscible with the non-solvent bath, and conditions tending to produce an emulsion with the powder base solution as the internal phase are maintained, the preliminary grains may be resolved into globular form and may, if desired, be completely solidified and employed as a propellent powder in this shape, without further operations of grain formation.

In accordance with the present invention a substance such as purified cellulose or starch is employed as the raw material for the smokeless powder base. For the purpose of illustration, cellulose will be considered as the raw material to be employed in the specific examples to be hereinafter described. Nitrocellulose may be prepared from such cellulose by nitrating in the usual manner, as by treatment with nitric acid and sulphuric acid. In accordance with the present invention, however, the cellulose after being nitrated to the desired extent may preliminarily have the spent acid removed therefrom by suitable mechanical means as, for instance, centrifuging, pressing, etc. Thereafter the nitrocellulose may be drowned in water using the quantity of water required to produce an acidic solution containing not more than about 0.25% acid as $H_2SO_4$. A further wash with "hard" water will further reduce the acidity, the "hardness" of the water neutralizing acidic products which are liberated and consequently conserving water. Thereafter the nitrocellulose may be subjected to a displacement wash with a mild alkali water solution, as for example a solution of about 0.2% sodium carbonate (pH of 10.7) or 0.2% sodium bicarbonate (pH of 8.4). Either the "hard" water wash or the displacement wash or both may be dispensed with if the superficial acidity has been reduced to practically zero by the preceding treatment. While at this stage the nitrocellulose is substantially neutral as far as superficial acid is concerned, it is impure and unstable, deteriorates in storage and yields unsatisfactory results when subjected to the various stability tests, such as the German test.

Thereafter, while still suspended in the aforementioned displacement wash solution or a bath of fresh water, or, if desired, after having the excess water removed, the nitrocellulose may be treated with a solvent which is substantially immiscible with water. Suitable solvents are ethyl acetate, isopropyl acetate, methyl isobutyl ketone, as well as other organic liquids which are solvents for nitrocellulose not completely miscible with water (or any other non-solvent vehicle which may be employed in lieu of water), and are sufficiently volatile that they may be vaporized without having to resort to temperatures which are unsafe or inconvenient. The treatment with the solvent is preferably carried out to an extent sufficient to convert all of the nitrocellulose present to a lacquer. The lower the viscosity of the lacquer the more rapid the purification, but in balancing the economies consideration must be given to minimizing the amount of solvent employed, as high ratios of solvent not only increase the expense of solvent recovery, but increase the loss thereof. For economic operation, just enough solvent should be used to make a thick heavy lacquer which is withal readily workable. For example a lacquer having a viscosity such that a $\frac{5}{16}''$ diameter steel ball requires one thousand seconds to fall ten inches is sufficiently workable, but lower viscosities tend to speed the purification. Since the lower the inherent viscosity of the nitro-cellulose the less solvent required to obtain the optimum viscosity, nitro-cellulose having low inherent viscosity is favored.

The resulting nitrocellulose lacquer may then be washed to remove the remaining residual acid and impurities, and in order to facilitate this operation, the washing operation may be carried out in the presence of a substance whose adhesion tension toward nitrocellulose is greater than the adhesion tension of the spent acid toward nitrocellulose. For example, one of the organic amines, mentioned in the United States Patent No. 1,893,677, granted January 10, 1933, to Fredrich Olsen may be employed. Whether the organic amine is used or not, it is desirable to maintain the bath slightly alkaline. In cases where the aforementioned displacement wash has not been removed the alkalinity thereof may suffice, but if not, and in cases where fresh water has been employed during treatment with the solvent, a substance which supplies a limited concentration of hydroxyl ions but which has high neutralizing capacity for the spent acid may be added to the bath. For example, sodium carbonate, sodium bicarbonate, calcium carbonate or other compounds of alkali or alkaline earth metals having low alkalinity but high acid neutralizing capacity may be employed.

The washing operation may be accomplished by vigorously agitating the nitrocellulose lacquer in the water bath to which the purifying and neutralizing agents have been added. This results in breaking up the lacquer and dispersing the water throughout the particles of lacquer, with the result that the occluded acid is readily removed.

The water of the bath in which the washing operation is carried out may be used as the bath in the succeeding stages of the process, notwithstanding the fact that the water may contain salts resulting from the neutralizing agents above mentioned.

To protect the resulting powder against autocatalytic decomposition, one of the usual stabilizers as, for example, the centralities or diphenylamine, may be added so that the desired amount becomes incorporated within the individual particles of lacquer. To this end, if diphenylamine is introduced concommitantly with the volatile solvent above mentioned, the diphenylamine serves the dual function of reducing the adhesion tension between the acid and the nitrocellulose, and stabilizing the resultant powder.

In order to assure the elimination of occluded water from the particles of nitrocellulose lacquer, the external aqueous phase of the mixture may have added to it a solute by means of which a difference in physical properties such as osmotic pressure and vapor pressure is created between the water constituting the external phase and the water which is contained within the nitrocellulose lacquer, so that the water within the particles of nitrocellulose lacquer will migrate to the exterior thereof, as more fully disclosed in U. S. Patent 2,160,626 to Harold F. Schaefer, granted May 30, 1939.

If it is desired to resolve the particles of nitrocellulose lacquer into globular or droplet form, agitation may be interrupted to allow the lacquer to separate into strata one of which is composed of water with dissolved salts, and the other of which is composed of nitrocellulose lacquer with perhaps some water emulsified therein.

Agitation may then be resumed and a suitable protective colloid or emulsifying agent conducive toward the production of the oil in water type of emulsion may be added. For example, a solution of gum arabic may be introduced at this time. Thereupon agitation of the mixture may be resumed and continued to an extent sufficient to break up and disperse the nitrocellulose lacquer in the form of fine droplets or globules throughout the water phase.

After the agitation has been maintained to an extent and for a time sufficient to produce particles or globules of the approximate size desired, the temperature of the bath may be elevated to distil off as much of the solvent from the lacquer as may be desired at this time. In the event that it is desired to produce powder grains of the solidified droplet type, the distillation may be proceeded with as indicated in U. S. Patent No. 2,027,114 granted January 7, 1936, until substantially all of the solvent is removed from the dispersed globules of lacquer. If, however, it is desired to extrude the nitrocellulose so as to produce the extruded type of smokeless powder grains, distillation may be continued only for a time sufficient to vaporize part of the solvent from the lacquer.

The distillation may be proceeded with, it being understood that agitation is maintained to an extent sufficient to maintain the globules or particles in dispersion throughout the period of distillation, for a time sufficient to solidify the globules or particles to an extent such that while they are definitely shaped they may nevertheless be compressed by the application of a moderate pressure. While in this condition the particles or globules are definitely self sustaining, they are nevertheless sufficiently pliable to be compressed without sharp fracture. Ordinarily the distillation may be stopped when the solvent content of the nitrocellulose lacquer has been reduced to an extent such that the particles or globules are composed of about from four to six parts by weight of solvent to five parts of nitrocellulose depending upon the inherent viscosity of the nitrocellulose. The time required for distillation of solvent to this extent varies according to the solvent content of the original lacquer as well as other variables but in general may vary from about four hours where the solvent to nitrocellulose ratio is 8:1, to as little as two hours where the ratio is 4:1. It will be understood, of course, that during the distillation process, the solvent may be recovered in any suitable manner.

The grains of nitrocellulose may then be removed from the suspension by draining on a suitable screen, centrifuging, or the grains may be allowed to settle and the supernatant liquid removed by decantation. When it is desired to remove the water-soluble materials present, washing treatments with hot water may be applied. Centrifuging of the grains brings down the water content to about 10%, a substantial proportion of which exists as a film on the surface of the globules. In cases where this water content may interfere with subsequent operations, as in preparing extruded cords, this surface water may be readily removed by a displacement wash with a small volume of alcohol applied in any suitable manner as by spraying during centrifuging of the globules, or by collecting the globules in a suitable vessel and allowing the alcohol to wash the globules by gravity flow.

The use of an alcohol wash as above described is to be distinguished from the prior displacement dehydration procedures with alcohol since conversion of the nitrocellulose to preliminary grains permits removal of all but about 10% of water by simple physical means in contrast to the 30 or 35% minimum water content attainable with fibrous nitrocellulose. Furthermore, the fact that the moisture is largely on the globule surfaces, coupled with the fact that liquid flow takes place readily through a layer of the globules, leads to the ready removal of any excess water with a small volume of alcohol in a simple and rapid fashion.

The nitrocellulose globules with the desired content of solvent are then thoroughly kneaded in suitable apparatus to form a uniform mixture containing completely gelatinized nitrocellulose which may then be extruded in the form of cords, strips, or ribbons by means of the customary presses and dies. When it is desired to form the nitrocellulose into sheets, the globules may be taken from the distillation vessel in semi-hardened form, washed if desired, centrifuged, and passed through suitable rolls. The resulting sheet may then be subdivided into strips or flakes of any desired shape.

The resultant powder grains may be subjected to a further solvent recovery system in which the residual solvent is driven off by evaporation until the solvent content is reduced to approximately five to ten percent or less, depending upon the thickness of the web of the grain which has been formed. With relatively thick grained powder it may be necessary to provide a water-dry treatment to bring about the removal of the residual solvent. Whether a water-dry treatment is employed or not the grains may be air-dried in the usual manner as, for example, at a temperature of from 50 to 60° C. until the volatile material is reduced to from one-half to two percent depending upon the thickness of the web of the grains. In general it is desirable to remove as much of the solvent as may be conveniently done without resorting to unduly protracted drying periods. Although two or three months air drying may, in some cases, be required, two to three days will generally be sufficient to bring about the reduction of the solvent to the point at which no ballistic instability will be encountered during subsequent storage, either with powders stored in bulk, or in the form of loaded charges.

When a solvent for nitrocellulose which also has a fairly high solvent power for water, such as methyl ethyl ketone, is employed, the composition for extrusion may be prepared directly by mixing the centrifuged particles with the required amount of added solvent, careful dehydration as by means of an intermediate alcohol wash being unnecessary. When a solvent such as methyl ethyl ketone having substantial mutual solubility with water is employed, the particles of lacquer resist resolution into the globular form and tend to odd shapes which however is not undesirable, especially when they are to be mechanically compressed as in the extrusion or rolling process. Such excess water as may have dissolved in the lacquer is released during the solvent recovery and drying treatments just described.

If desired, of course, it will be understood that the powder grains may be subjected to any desired coating or surface treating operation. Moreover when it is desirable to do so any of the combustion modifiers, such as accelerators of the type of nitroglycerin or deterrents of the type of dinitrotoluene, dibutylphthalate, etc., may be incorporated with the powder while in the form of lacquer. In the manufacture of double-base powders having incorporated nitroglycerin, it is desirable to add the nitroglycerin to the suspension of nitrocellulose globules directly after the removal of part of the solvent by distillation has been completed, since rapid absorption of the nitroglycerin by the nitrocellulose may thus be secured.

While in the foregoing general description of the process of this invention the procedure has been described as a continuous one from the stage of nitration to the stage of graining, it will be understood that semi-hardened globules or particles of nitrocellulose lacquer may be consolidated into blocks for graining as hereinbefore described, whether or not the nitrocellulose of the lacquer has been purified in accordance with the process hereinbefore described. For example, in the process of manufacturing propellent powders described in U. S. patent to Fredrich Olsen et al. No. 2,027,114, issued January 7, 1936, it will be understood that the globules of nitrocellulose lacquer may be removed from the still while they still contain a substantial percentage of solvent and may be subjected to the consolidating and graining operations hereinbefore described. Furthermore, a short boiling treatment for partial removal of the acid as well as unstable compounds which are present may be applied to freshly nitrated nitrocellulose following the "drowning" thereof in water, particularly when the procedure is so operated that the nitrocellulose is stored for a length of time before treatment under the preliminary grain forming and purifying step.

Likewise, it will be understood that surplus or deteriorated colloided smokeless powder grains, such as small arms or cannon powder grains, may be readily reworked and reconverted by treatment in accordance with the above-described procedure into extruded propellent powder grains of desired form and size. When colloided smokeless powder grains, such as of surplus cannon powder, are used as starting material, they may be treated with sufficient solvent to form a lacquer. A smaller proportion of solvent, for example, an amount equal to the weight of powder may be used, if the grains are first reduced by grinding to a fine particle size such as passing through a forty mesh or finer screen. In the latter case, agitation of the resulting suspension will cause the formation of agglomerates of the softened nitrocellulose particles, which may then be subjected to further treatment as described above, without however requiring any removal of solvent by distillation.

As an illustrative embodiment of the present invention one hundred pounds of cellulose which has been nitrated in the usual manner may have the excess spent acid removed therefrom by mechanical means, such as centrifuging. It is, however, impossible to remove all of the spent acid in this manner. Thereupon, the nitrocellulose may be drowned in water, using, for example, eight hundred gallons of water. The water with dissolved salts, esters and impurities may be drained from the nitrocellulose and the nitrocellulose given a simple wash with hard water followed by a displacement wash in water containing 0.2% sodium carbonate. The nitrocellulose is then drained and while still wet from the washing operation, the nitrocellulose may be treated with, for example, six hundred pounds of ethyl acetate in order to dissolve the nitrocellulose and convert it into a lacquer-like mass. The lacquer may then be agitated in, for example, eight hundred pounds of water in the presence of about two pounds of aniline red, and one and one-half pounds of calcium carbonate. Agitation is continued to the extent necessary to remove the residual spent acid from the nitrocellulose. If it is desired to incorporate a stabilizer, about one and one-half pounds of diphenylamine may be added to the lacquer at any time, but if added to the lacquer initially the aniline red may be omitted, as the stated amount of diphenylamine will suffice to reduce the adhesion tension between the residual spent acid and the nitrocellulose, as well as to stabilize the powder.

In case it is desired to resolve the particles of lacquer into globular form, agitation of the mixture may then be discontinued for time sufficient to permit the mass to coalesce or separate into strata. After the mass has coalesced, gum arabic in an amount equal to about 1% of the water present may be added to the bath and agitation resumed. The presence of gum arabic or any other emulsifying agent or protective colloid conducive to the production of an oil in water emulsion negatives the natural tendency of nitrocellulose lacquer to emulsify water within it; but when it is not important to resolve the particles into globular shape, the procedure described in this paragraph may be omitted.

The mass is agitated vigorously so as to produce and disperse fine globules of nitrocellulose lacquer throughout the water, ordinarily about thirty minutes of such agitation being necessary to produce globules in the form of spheres about 0.015 inch in diameter.

In order to insure the release of any water which may be occluded within the globules of nitrocellulose lacquer, a solute may be added to the external aqueous phase at this time. For example, sodium sulphate in an amount of about two percent of the weight of the water may be added. The temperature of the water-lacquer mixture is then elevated, while agitation is maintained, to an extent sufficient to distil the solvent from the globules of lacquer. The period of distillation is dependent upon the temperature, the vapor pressure and other variables as well as upon the type of powder grain it is desired to produce. In the event that it is desired to extrude the nitrocellulose lacquer to form powder grains, the distillation may be discontinued when the solvent content is reduced to a point where the globules contain eight parts solvent to ten parts nitrocellulose.

When distillation has proceeded to this extent the partially solidified particles or globules of nitrocellulose lacquer may be removed from the bath, centrifuged to about 10% moisture content, washed with a small volume of alcohol, kneaded, and converted into grains as by extrusion through the usual dies in order to provide perforated or imperforated cylindrical grains or cords as may be desired or, the centrifuged globules may be passed through rolls to form sheets which may be further subdivided into any desired form.

This invention thus provides for the concurrent gelatinization and purification of the smokeless powder base. This not only minimizes the duration and expense of the manufacturing process, but also enables the attainment of more complete and uniform results in both purification and gelatinization than has been possible in the prior art processes, in which the treatments have been applied separately.

A significant advantage of the improved and shortened purification method of this invention is that in the treatment of nitrocellulose produced with the use of a given composition of nitrating acid, a purified nitrocellulose results which has a higher nitrogen content than by the protracted boiling treatments taught by the prior art.

A high degree of uniformity in the gelatinization is facilitated by the use of the high proportion of solvent, which can conveniently be applied in the process of this invention in view of the efficient recovery of excess solvent which is possible, by the elevated temperature conditions to which the lacquer is subjected during part of the procedure, and by the thorough mixing enabled by the use of a suspending medium, such as water, for the lacquer. Heretofore, only that amount of solvent has been added for gelatinization which is required for the extrusion of the final composition, as contrasted with the use in accordance with this invention of an excess of solvent, which excess is removed prior to the final graining operation.

The purification and stabilization of the smokeless powder base is rendered more rapid and complete in the treatment herein described than in prior methods principally because of the improved contact provided between impurities and reagents. Rather than depending, as in the prior methods of purifying nitrocellulose fibers, on the necessarily slow diffusion through capillary passages of reagents into the fibers and of dissolved impurities outward to the treating and washing baths, the powder base is dispersed to lacquer form and adequate contact between the impurities and reagents is provided in the extensive and mobile interface between the lacquer and the treating bath.

A considerable advantage over prior methods is also provided in the elimination of the step of displacement dehydration of fibrous nitrocellulose which has heretofore been essential in the manufacture of colloided smokeless powder grains cut from a continuous extruded cord, strip, or sheet.

From the foregoing description it should be apparent that the present invention accomplishes its objects and provides an advantageous and economical process for the manufacture of smokeless powder whereby the cost of product is not only decreased but an improved product obtained.

While in the foregoing description reference has been made to the use of cellulose and nitrocellulose respectively as the raw material and smokeless powder base employed in the process, it will be understood that the process is applicable likewise to the other raw materials and smokeless powder bases, for example, as starch and nitrostarch and hence in the appended claims, "cellulose" and "nitrocellulse" are to be construed as inclusive of other suitable raw materials and smokeless powder bases. Likewise, while in the foregoing description water has been described as the washing medium and as the medium in which the nitrocellulose lacquer has been dispersed, it is obvious that any other liquid vehicle which is not a solvent for nitrocellulose and in which the solvent selected for nitrocellulose is not substantially miscible or soluble may be employed in lieu thereof, and consequently in the appended claims "water" is to be construed as including such other non-solvent media.

While in the foregoing specification a general disclosure of the process has been made and has been supplemented by a specific embodiment thereof, it is not to be understood that the present invention is limited to that embodiment. On the contrary, it is to be distinctly understood that the process is susceptible of many variations, modifications and adaptations which will occur to those skilled in the art. Consequently, it is to be distinctly understood that such modifications and the use of such individual features and combinations of features which do not depart from the spirit of this invention are, although not specifically described herein, contemplated by and within the scope of the appended claims.

Having thus described the invention what is claimed is:

1. In the art of making smokeless powder, the process comprising, nitrating cellulose, mechanically removing the spent acid, drowning the nitrocellulose in water, draining the nitrocellulose, washing the nitrocellulose, dissolving the wet nitrocellulose while still containing some residual spent acid in a solvent to form a lacquer, washing the lacquer in water with an amine whose adhesion tension toward nitrocellulose is greater than that of the unremoved acid, adding to the washing bath an agent for neutralizing the acid, treating the water-lacquer mixture with an emulsifying agent tending to produce oil in water emulsions, dispersing the lacquer in the form of globules in the water, partially distilling the solvent from the lacquer, removing the partially solidified lacquer globules from the water, and compressing the partially solidified lacquer globules together.

2. In the art of making smokeless powder, the process comprising, dissolving nitrocellulose containing unremoved acid from the nitration process in a solvent to form a lacquer, agitating the lacquer in water containing an organic amine whose adhesion tension toward nitrocellulose is greater than that of the unremoved acid to break the lacquer into particles, distilling off part of the solvent from the particles of lacquer, draining the water from the partially solidified particles, collecting a multitude of the partially solidified particles together, and extruding the collection of particles to form grains.

3. In the art of making smokeless powder, the process comprising, forming a lacquer of nitrocellulose in a solvent therefor which is substantially insoluble in water, agitating the lacquer in a bath of water to break the same into particles, distilling off part of the solvent from the particles to partially solidify the same, collecting a multitude of the partially solidified particles together, and extruding the collection of particles into grains.

4. In the art of making smokeless powder, the process comprising, forming a lacquer of nitrocellulose and a solvent therefor which is substantially insoluble in water, agitating the lacquer in a bath of water to break the same into particles, distilling off the solvent until the particles are substantially self sustaining but pliable under moderate pressure, draining the water from the particles, consolidating a plurality of particles to form grains, and further removing solvent from the formed grains.

5. In the art of making smokeless powder, the process comprising, forming a lacquer of nitrocellulose and a solvent therefor, dividing the lacquer into relatively small parts, partially distilling the solvent from the lacquer while the parts are maintained separate to partially solidify the individual parts, consolidating the partially solidified parts under pressure, and forming grains from the consolidated mass.

6. In the art of making smokeless powder, the process comprising, forming a lacquer of nitrocellulose and a solvent therefor which is substantially insoluble in water, dispersing the lacquer in the form of globules in a bath of water, distilling off part of the solvent from the globules to partially solidify the same, removing the globules from the bath and dehydrating the same, and pressing the mass of globules to consolidate the same.

7. In the art of making smokeless powder, the process comprising, forming a lacquer of nitrocellulose and a solvent therefor which is substantially insoluble in water, dispersing the lacquer in the form of globules in a bath of water, distilling off part of the solvent from the globules to partially solidify the same, collecting a multitude of the partially solidified globules together, and extruding the collection of globules to form grains.

8. In the art of making smokeless powder, the process comprising, forming a lacquer of nitrocellulose and a solvent therefor which is substantially insoluble in water, dispersing the lacquer in the form of globules in a bath of water, distilling off the solvent until the globules contain about fifty percent solvent, draining the water from the globules, consolidating a plurality of globules to form grains, and further removing solvent from the formed grains.

FREDRICH OLSEN.